United States Patent [19]

Strobel et al.

[11] Patent Number: 5,181,241
[45] Date of Patent: Jan. 19, 1993

[54] LEAD LINE SUPERVISION SYSTEM

[75] Inventors: Donald H. Strobel, Brookfield; Donald F. Pridemore, Hartford; Greg M Gomez, Wauwatosa, all of Wis.

[73] Assignee: Badger Meter, Inc., Milwaukee, Wis.

[21] Appl. No.: 693,662

[22] Filed: Apr. 30, 1991

Related U.S. Application Data

[60] Continuation-in-part of Ser. No. 404,686, Sep. 8, 1989, Pat. No. 5,025,470, which is a division of Ser. No. 109,446, Jun. 19, 1987, Pat. No. 4,866,761, which is a continuation-in-part of Ser. No. 876,896, Jun. 20, 1986, Pat. No. 4,817,131.

[51] Int. Cl.$^5$ .......................................... H04M 11/00
[52] U.S. Cl. ...................... 379/107; 379/28; 379/93; 340/870.02
[58] Field of Search .................. 379/106, 107, 28, 93; 340/870.02, 512, 310 R; 324/511, 522, 537, 539

[56] References Cited

U.S. PATENT DOCUMENTS

| 4,337,466 | 6/1982 | Spahn | 379/107 |
| 4,357,601 | 11/1982 | McWilliams | 379/107 |
| 5,025,470 | 6/1991 | Thornborough et al. | 379/107 |

*Primary Examiner*—James L. Dwyer
*Assistant Examiner*—W. F. Chan
*Attorney, Agent, or Firm*—Quarles & Brady

[57] ABSTRACT

A data transmission system uses a malfunction detection circuit for detecting malfunction conditions between a data transmitting station and a data receiving station connected with first and second data transmission lines. The malfunction circuit senses a data signal of a first polarity for a preselected duration and provides an output signal when the data signal exceeds the preselected duration. The circuit also supplies a detection signal of a second preselected duration in a polarity opposite the data signal and detects the presence of or the absence of the detection signal. The circuit thereafter provides an output signal indicative of the malfunction condition when the absence of the detection signal exceeds the second preselected duration.

17 Claims, 4 Drawing Sheets

LEAD LINE SUPERVISION SYSTEM

REFERENCE TO RELATED APPLICATIONS

This application is a continuation-in-part of application Serial No. 404,686, filed Sep. 8, 1989, now U.S. Pat. No. 5,025,470 entitled "Automatic Meter Reading System With Malfunction Protection," which is a division of application Ser. No. 109,446, filed Jun. 19, 1987 now U.S. Pat. No. 4,866,761, which is a continuation-in-part of application Ser. No. 876,896 filed Jun. 20, 1986, which issued as U.S. Pat. No. 4,817,131.

A related application Ser. No. 472,612, filed Jan. 29, 1990, entitled "Automatic Meter Reader With Microcomputer Control System," assigned to the assignee of the present invention, further describes control arrangements and techniques for acquiring meter data. A second, related application Ser. No. 189,533, filed May 3, 1988, entitled "Flexible Piezoelectric Switch Activated Metering Pulse Generators," which issued Sep. 19, 1989 as U.S. Pat. No. 4,868,566, also assigned to the assignee of the present invention, discloses arrangements for developing meter pulses in an automatic meter reading system. The disclosures of the above referenced patents and applications are incorporated herein by reference.

FIELD OF THE INVENTION

The present invention relates to detection circuits and methods used in systems for transmitting data between two locations, and in particular, to a circuit for detecting the status of a two-wire lead line used for transmitting data between a signal transmitter and a corresponding receiver placed at a remote location, as for example, in an automatic meter reading system.

BACKGROUND OF THE INVENTION

A data transmission system is typically used to supply data between a transmitting station and a receiving station for the transmission of data to and between remote locations. As an example, an automatic meter reading system may use a data receiving station for supplying control signals to a plurality of remote meter units. The automatic remote meter units may operate to supply data pulses to the data receiving station indicative of use of a utility. A communication link may be employed which uses a pair of wires for supplying control signals to and for receiving data from the meter units.

Data transmission systems used for automatic transmission of meter data to a remote location typically utilize telephone or other data transmission media for the automatic reporting of meter or status data. In many such systems, the receiving station, upon receipt and accumulation of meter pulses, thereafter supplies an interrogation signal via the transmission medium to a reporting station to initiate the sending of a report. Such systems may involve ringing of the customer's telephone or the installation of special ring-suppress equipment at the customer's facility. Alternatively, special equipment at the telephone exchange may be utilized. In other types of systems, a reporting system initiates the making of a report.

Security for such transmission systems is critical to the integrity of the operation of the system and to prevent malfunctions of the system from various causes. For example, in systems for monitoring water, gas, or electric consumption at a residential or commercial location, a possibility of tampering with the metering equipment exists which prevents transmission of accurate data to a utility. Unauthorized individuals may attempt to alter data supplied by the automatic meter unit to reduce the consumption detected by the receiving station. Alternatively, attempts may be made to by-pass the meter unit altogether to eliminate any detection of consumption by the receiving station. In addition, normal operation of the system may be interrupted due to natural or unintentional causes.

SUMMARY OF THE INVENTION

This invention was evolved with the general object of providing systems and methods for detecting malfunctions while effecting metering operations, operating with a high degree of reliability while having very low current consumption and while simplifying construction, the required number of components and minimizing manufacturing costs.

Important aspects of the invention relate to the discovery and recognition of problems with prior art systems and methods, particularly with regard to the complexity of prior systems and their operation, the requirement for high power consumption, problems with unreliability, and excessive operating times and requirements for operator intervention.

The present invention overcomes the problems inherent in prior art systems with a malfunction leadline supervision circuit in a data transmission system having a transmitting station connected via lead lines with a remote receiving station. In the illustrated embodiment, the transmitting station is connected to a remote receiving station through first and second lead lines and includes current gating means connected between a pair of output terminals. The transmitting station normally operates to provide data pulses of a first polarity, at a preselected time and for a preselected duration, to the receiving station. The receiving station senses the presence of the pulses and provides an output signal when the duration of a pulse exceeds a preselected duration, indicative of a malfunction or a short circuit condition in the data path between the transmitting station and the receiving station.

The supervision circuit also provides a detection signal of a second polarity, at a preselected time and for a preselected duration, to the transmitting station. The receiving station senses the presence of or the absence of the detection signal and provides an output signal when the absence of the detection signal exceeds a second preselected duration, indicative of an open circuit or other malfunction condition between the receiving station and the transmitting station.

BRIEF DESCRIPTION OF THE DRAWINGS

The novel features of the present invention are set forth with more particularity in the appended claims. The invention, together with advantages thereof, may be understood more fully by reference to the following detailed description taken in conjunction with the accompanying drawings in which like reference numerals are used to indicate like elements and in which:

DETAILED DESCRIPTION OF PREFERRED EMBODIMENTS

This invention relates to a malfunction detection system which is used for detecting normal and malfunction conditions between a transmitter station and a remote receiver station connected by a data transmission medium. In the embodiments illustrated herein, the transmitter station supplies data pulses to the receiver station which are monitored for a preselected duration for determining whether a short circuit condition exists. The receiver station periodically supplies an open circuit detection signal to the transmitter station and senses the absence of the detection signal for a preselected time for determining whether an open circuit condition exists. The invention has one particular use in an automatic meter reading system as described in connection FIG. 1. However, the invention is not limited to this application and may be utilized in any data transmission arrangement having a receiving section that receives data pulses from a transmitting section via a data transmission medium.

Figure 1:
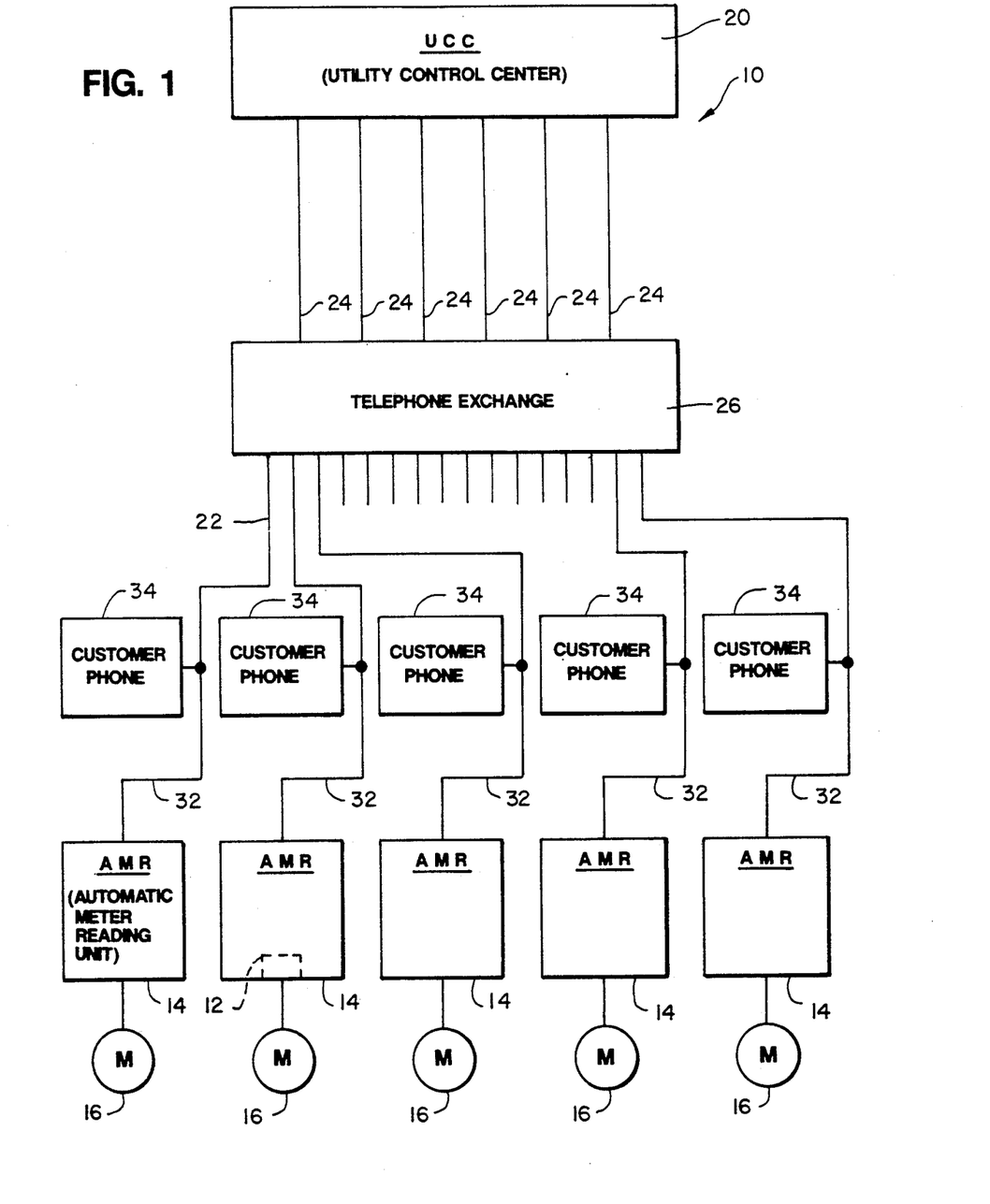
FIG. 1 is a block diagram of a meter reading system which is suitable for use with the present invention.

FIG. 1 shows an integrated automatic meter reading system 10. The malfunction protection or tamper proof feature of the present invention includes leadline monitoring control circuitry 12 located within an automatic meter reading unit 14, described in further below. The control circuitry 12 supplies detection control signals to a metering unit 16 having an output metering switch 18, which is illustrated in the block diagram of FIG. 2. The malfunction protection circuitry 12 is suitable for use in the integrated automatic meter reading system 10. The system 10 is shown in greater detail in the aforementioned prior applications, the disclosure of which are incorporated by reference.

The automatic meter reading system 10 includes a central processing station or utility control center ("UCC") 20. The UCC 20 is connected through one or more telephone lines 24 to telephone exchange equipment 26. The system also includes a plurality of automatic meter reading units ("AMRs") 14 connected via data transmission lines 28 and 30 to the meters 16 (See FIG. 2). As an example, the meters 16 may be water, gas, or electric meters at customers' residences. Each AMR 14 is connected to the exchange equipment via a telephone line 32 which may be a non-dedicated line with a customer's telephone 34 connected thereto, as shown.

The system 10 receives raw meter data developed at each of the plurality of meters 16, processes and stores such data, and provides output data for use by a utility or municipality. The output data typically includes meter readings obtained at predetermined time intervals, time-of-day accumulation (TOD) data, peak rate data (PR) and leakage, tamper, and malfunction indications. The mode of operation is programmable from the UCC 20 to facilitate initial installation of AMR units, discontinuing service to one customer, and starting service to another. The system 10 accomplishes this by keeping track of the operational status of all units, making analyses of operations and generating reports which may be printed or transmitted.

In operation, each AMR 14 receives and processes raw meter data, and continually develops and updates TOD and PR data as well as accumulated readings. At an assigned time, typically at a certain day of the month and a during night-time period when the customer is least apt to be using the telephone, the AMR 14 goes into an off-hook condition and, if dial tone is detected, it then proceeds to dial a telephone number corresponding to a line which is connected to the UCC 20. In one mode of operation, it waits for receipt of a carrier signal from the UCC 20. In another, it waits for the expiration of a certain delay time. In either case, the AMR 14 then proceeds to apply signals to the telephone line 32, in an attempt to send data to the UCC 20. Such data includes identification and security data and status data as well as the processed meter data.

The UCC 20 stores and processes received data, making a security check and making a determination of new data to be supplied to the AMR 14. Such new data are preceded by an acknowledgement character and may include security data and the time for the next call-in by the AMR 14. If properly received, the AMR 14 responds with an acknowledgement character and security data. The UCC 20 thereafter may send another acknowledgement character and control data such as an exemption schedule for holiday days when TOD/PR data are not to be accumulated and/or data as to new "window" or periods during each day when TOD or PR data are to be accumulated. After a final acknowledgement character from the AMR, both the AMR and UCC go to on-hook conditions.

The UCC 20 stores control data which may include a telephone number of the UCC 20 and other data which might be classed as "global" data applicable to all AMR units. The UCC 20 stores data corresponding to each individual AMR 14 such as its serial number and data relating to the day of the week, month, quarter or other convenient time period in which it is to report. Such control data can be modified from the UCC 20. However, at the time of call-in from any AMR 14, the UCC 20 is in a condition to quickly determine, from data stored in memory, the control data to be sent to the AMR 14 which initiated the call. It will be understood by those skilled in the art that one or more of the above described operations performed by the UCC may alternatively be performed with the implementation of a call collection module ("CCM") with appropriate modification. For example, one or more CCM's may be coupled with the UCC 20 and the telephone exchange equipment 26. Such arrangements are further described in the above referenced patents and applications for patent.

Figures 2, 3:
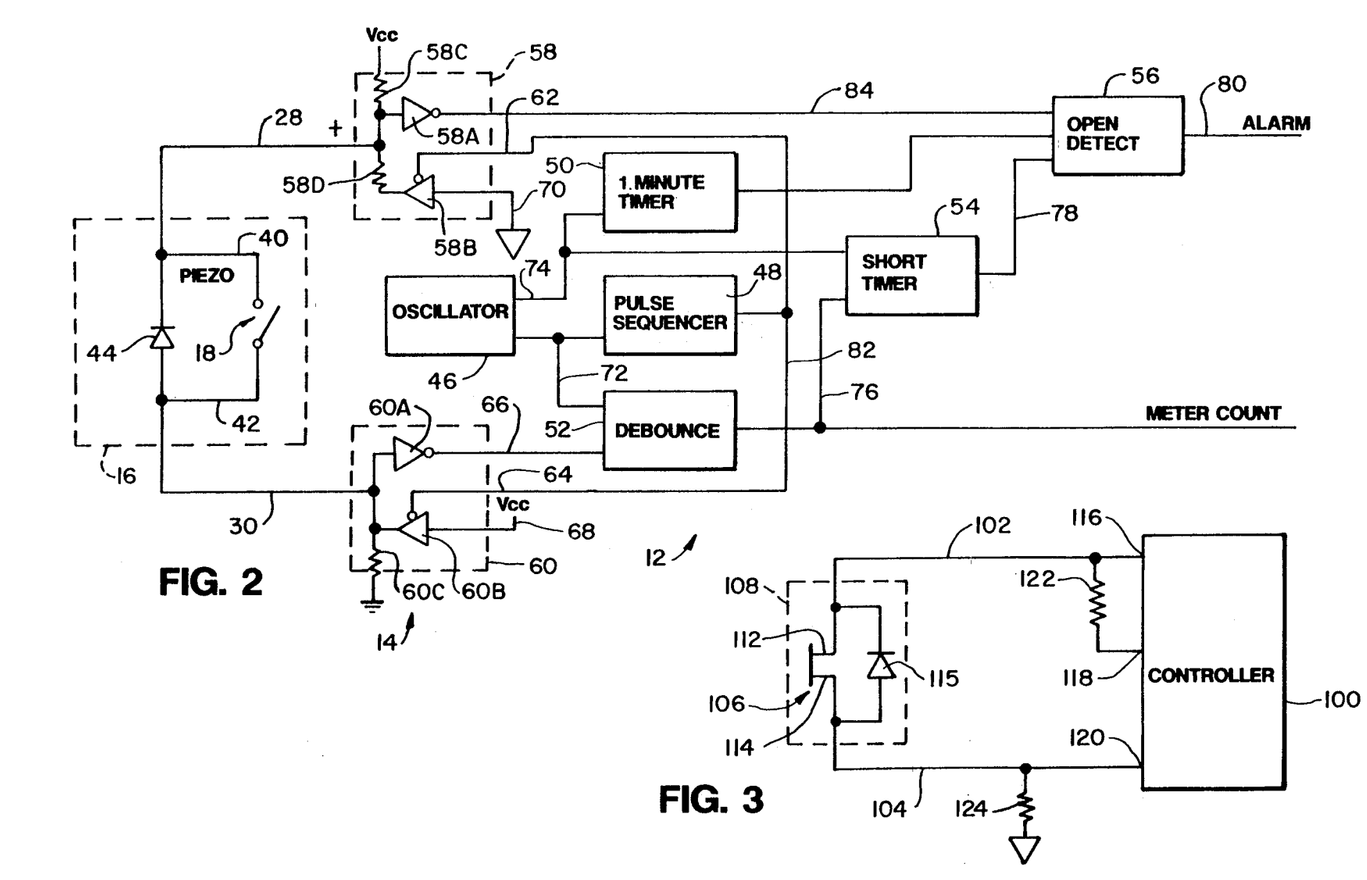
FIG. 2 is a block diagram of a detection circuit for detecting normal and malfunction conditions between the receiving station and the transmitting station in the meter reading system shown in FIG. 1.
FIG. 3 is a block diagram of a detection circuit showing a data receiving station implementing a microprocessor in an alternative embodiment of the present invention.

FIG. 2 illustrates a block diagram of a lead line monitoring circuit 12 used to detect metering pulses and also to detect open circuit and short circuit or other abnormal operating conditions that may exist between one of the plurality of meter units 16 and a selected AMR 14. The malfunction detection functions are desirable in arrangements in which the meter unit 16 is located at a distance from the AMR 14 or is otherwise arranged such that exposed connecting wire might be cut by a customer. Alternatively, the connecting wire may accidentally become severed so as to be continuously opened or shorted so as to be continuously closed.

The selected AMR 14 supplies control signals to and receives meter data pulses from the meter unit 16 via a pair of data transmission lines 28 and 30. The meter unit 16 includes a piezoelectric switch (shown diagrammetrically as numeral 18) at its output. For example, the piezoelectric switch 18 may be the momentary closed type, having an open drain FET transistor between the output terminals 40 and 42 of the piezoelectric switch 18 as will be understood by those skilled in the art to which this invention pertains.

The output terminals 40 and 42 are, in turn, connected with the data transmission lines 28 and 30, respectfully. As shown in FIG. 2, a diode 44 is connected between the output terminals 40 and 42. The diode 44 has its cathode connected to the output terminal 40 and its anode connected to the output terminal 42.

For detection of metering pulses, and also for detection of short circuit conditions, the transmission lines 28 and 30 are normally connected through resistances in the AMR 14 to the positive and negative terminals of a supply voltage source to thereby be at relative plus and minus potentials, as indicated by the + and − signs in FIG. 2. In response to normal metering closures of the switch 18, the line 30 goes more positive for a time interval having a duration within certain limits. The monitoring circuit detects such normal closures and may thereafter supply accumulated data to the UCC 20 at appropriate times, as further described in the aforementioned applications and patents.

One type of malfunction is indicated when line 30 remains positive for an excessive interval of time, as may be caused for example by shorting of the lines 28 and 30 or shorting of the switch 18 itself. To detect an open condition, as hereinafter described, a test is performed periodically in which the relative polarity of voltages applied to lines 28 and 30 is reversed in a manner such as to develop a positive signal at the line 28 if the diode 44 is present.

As shown in FIG. 2, the monitoring circuit 12 includes an oscillator circuit 46, a pulse sequencer circuit 48 which supplies output pulses at a preselected time to initiate operation of the detection processes, a timer circuit 50 for operating during the open circuit check, and a debounce circuit 52, which for example may be of the type described in said aforementioned applications and patents, for supplying a meter count output signal. The monitoring circuit 12 also includes a short timer 54 for receiving output signals from the oscillator circuit 46 and the debounce circuit 52, and an malfunction detection circuit 56 which receives signals when a short or an open circuit condition is sensed and supplies an output signal indicative of a malfunction condition.

In addition, the monitoring circuit 12 includes first and second bidirectional data ports 58 and 60 which receive data from and supply monitoring signals to the meter unit 16. The ports 58 and 60 as shown include inverters 58A and 60A, tri-state gates 58B and 60B and resistors 58C and 60C connected to the lines 28 and 30. The resistor 58C is connected to VCC to operate as a pull-up resistor and the resistor 60C is connected to ground to operate as a pull-down resistor. Likewise, the output of the gate 58B is coupled with the line 28 via a resistor 58D. In this way, the lines 28 and 30 are thereby placed normally at relative positive and negative potentials as indicated.

Each of the bidirectional ports 58 and 60 further includes input enable terminals 62 and 64 connected to the tri-state gates 58B and 60B, respectfully, for receiving an enable signal from the pulse sequencer circuit 48. When enabled by a signal applied to the input enable terminals 62 and 64, the tri-state gates 58B and 60B respectfully couple the lines 28 and 30 to ground and to VCC, to thereby reverse the relative potentials of the lines 28 and 30 and to permit detection of the absence of an open condition, if the diode 44 is present and properly operating. In a normal mode of operation, the enable signal is inhibited at the input terminals 62 and 64. In this mode, periodic closures of the switch 18 provide data pulses to the AMR 14. Accordingly, data pulses are received at the data ports 58 and 60. A negative pulse received at the data port 60 is inverted and thereafter provided to the debounce circuitry 52 via a line 66.

The short circuit malfunction test operates when data pulses are regularly received from the meter 16. When the switch 18 operates properly and no malfunction condition exists in the data lines 28 and 30, periodic data pulses are supplied to the data ports 58 and 60. As noted above, a positive pulse is received at the line 28 and a negative pulse is received at the line 30. The negative pulse received on the data line 30 is inverted and supplied to the debounce circuit 52. The oscillator circuit 46 supplies a periodic output signal to the debounce circuit 52 on a line 72 and to the short timer circuit 54 on a line 74. An output signal is supplied from the debounce circuit 52 is also provided to the short timer circuit 54 on a line 76 indicative of a meter pulse count. This signal may also be supplied to an accumulator in the AMR 14 for reporting meter data.

Upon receipt of the meter pulse signal, the short timer circuit 54 monitors the duration of the pulse signal. If the duration of the pulse signal exceeds a preselected time constant, for example 125 milliseconds, the short timer circuit generates an output signal on a line 78. The malfunction detection circuit 56 receives the output signal and generates an alarm signal on a line 80 indicative of a short circuit condition.

In another mode of operation, the pulse sequencer circuit 48 supplies an enable signal the data port enable terminals 62 and 64 for initiating an open circuit test. In this mode, a relative positive potential is developed at the data transmission line 30 via a line 68. Similarly, a relative negative potential is developed at the data transmission line 28 via a line 70.

The monitoring circuit operates the open circuit test at preselected time intervals, such as, for example, every 16 seconds or other generally more convenient time. In this mode, the bidirectional ports 58 and 60 are reconfigured so that the relative potentials of the lines 28 and 30 are reversed, as described above. As with the short circuit test, the oscillator circuit 46 supplies a periodic output signal to the pulse sequencer circuit 48 on the line 72 and to the open circuit timer circuit 50 on the line 74. At the appropriate time, the pulse sequencer circuit 48 supplies an enable signal on a line 82 to the data port enable terminals 62 and 64. Accordingly, a relative positive potential is developed at the data line 30 and a relative negative potential is developed at the data line 28.

The data port 60 supplies current to the meter 16 in a reverse direction. If the circuit is properly operating, current flows through the diode 44 and a relative positive potential is sensed at the data port 58. However, if an open circuit condition exists in the data lines or in the output circuit of the meter 16, a relative negative potential is sensed at the data port 58 and a malfunction signal is supplied to the malfunction detection circuit on a line 84.

It will be appreciated that the system according to this invention draws very small amounts of current during normal operating conditions and consumes very little power. In particular, the system draws current only when the switch 18 periodically closes for generating meter pulses or when the open circuit test is operated. When the open circuit test is operated, the system utilizes the existence of the diode 44 to intermittently supply small amounts of current to the transmitting station in a reverse direction. Accordingly, the present invention eliminates the use of additional impedances for detecting malfunction conditions in the transmitting circuit. This feature further decreases power consumption of the system.

FIG. 3 illustrates an alternative embodiment of the present invention which is suitable for use in other systems such as, for example, in applications using a microcontroller 100 connected via a pair of data lines 102 and 104 to an output switch 106 of a transmitting station 108. This particular arrangement may be utilized, for example, in a system where the automatic meter reader includes a microcontroller coupled with an output metering switch. As with the meter unit 16 described in conjunction with FIGS. 1 and 2, the output switch 106 of the transmitting station 108 includes a FET transistor 110 having source and drain terminals 112 and 114 connected to the data lines 102 and 104, respectively. A diode 115 is connected between the terminals 112 and 114.

In this arrangement, a plurality of data input/output ports 116 through 120 are used wherein a first data port 116 is connected to the data line 102, a second data port 118 is connected through a resistor 122 to the first data line 102, and a third data port 120 is connected to the second data line 104. A second resistor 124 is connected between the second data line 104 and ground.

In the normal mode of operation, the first data port 116 is used to output data corresponding to a high voltage signal to the data line 102. The second data port 118 is an input port and receives signals indicative of either normal operation or that a shorted condition is detected in the data path. The third data port 120 is an input port and receives signals from the transmitting station 108. In response to normal metering closures of the switch 106, the line 104 goes more positive for a time interval within certain limits. The microcontroller detects such normal closures via the data port 120 and thereafter manipulates such data as described in the aforementioned applications and patents.

Alternatively, when the system performs an open circuit test, the data port 120 functions as an output port and supplies a positive voltage signal to the transmitting station 108 on the line 120. In this mode of operation, the data port 118 functions as an output port and supplies a low voltage signal. The data port 116, in turn, functions as an input port. When no open circuit is present in the data path, current flows through the diode 115 and the data port 116 detects a high voltage signal. If, however, an open circuit condition is present, the data port 116 detects a low voltage signal. The microcontroller 100 may thereafter take appropriate remedial measures.

Figure 4A:
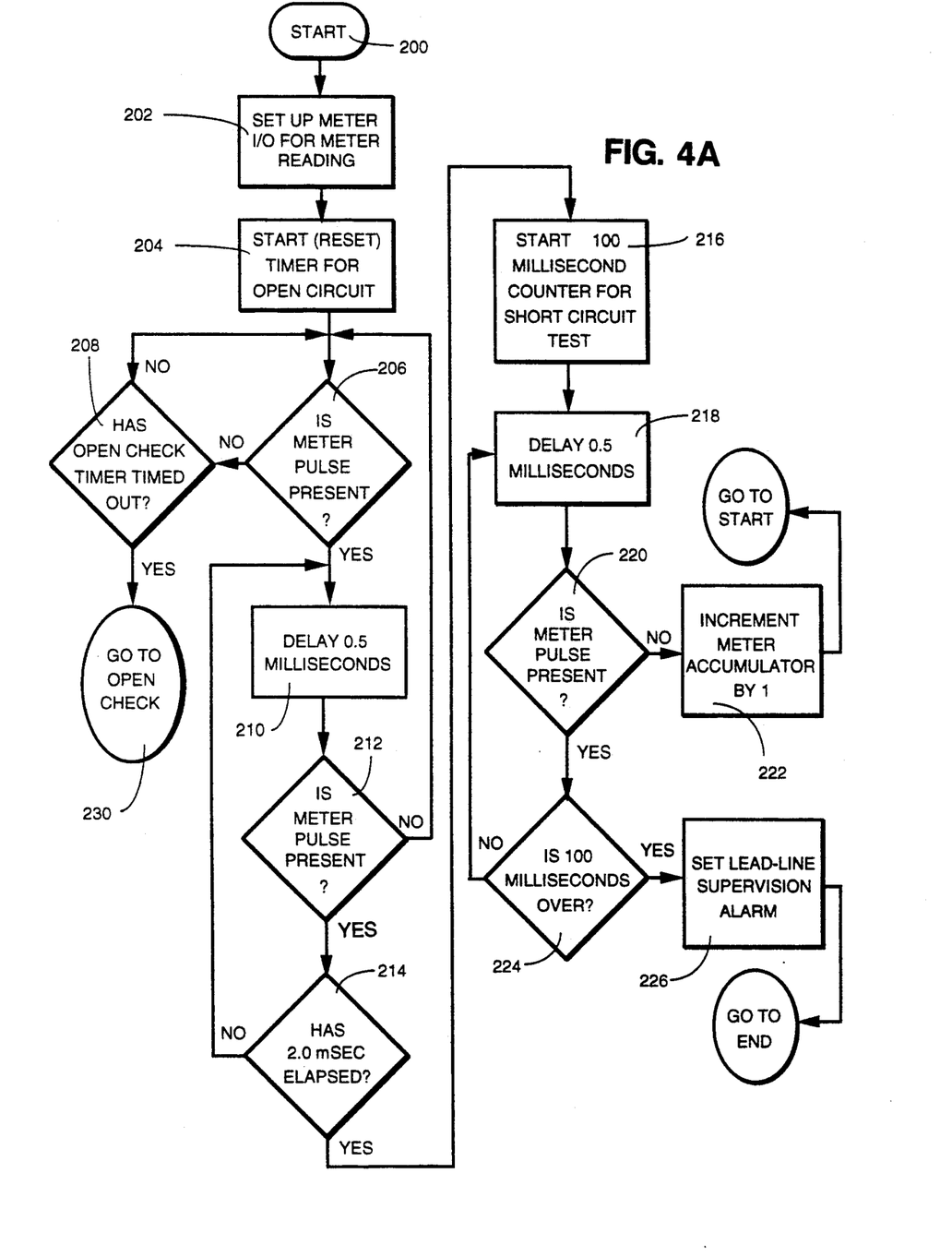
FIG. 4A is a flow chart illustrating operations performed by the microprocessor shown in FIG. 3 for detecting a short circuit condition.

FIG. 4A shows a logical flowchart for operation of the short circuit test in the malfunction detection system shown in FIG. 3. As shown, the system begins at a start block 200 and advances to a next block 202 at which initial conditions are set for a short circuit test, specifically, the data port 116 is set as an output port, the data port 118 is set as an input port, and the data port 118 is set as an input port as described above. The system then advances to a start timer step at a block 204 at which the timer for the open circuit check is set, as explained more fully below.

At a decision block 206, the system then determines whether the presence of a meter pulse is present at the data port 120. If no, the system determines whether the open circuit test timer has timed out in a decision block 208. If yes, the system advances to a block 210 and delays for a preselected time, such as 0.5 milliseconds. The system thereafter advances to a decision block 212, where the system determines whether the presence of a pulse signal is detected. If no, the system returns to the decision block 206 for determining whether a input pulse is present. If at a decision block 214, the detected pulse exceeds a preselected duration, the system advances to a second delay block 216, for beginning a counter of a longer duration, for example, 100 milliseconds.

The system then advances to a block 218 for beginning a further delay of 0.5 milliseconds. At a decision block 220, the system again polls the data port 120 to determine whether an input pulse is present. If no, the system advances to a block 222 wherein the meter accumulator is incremented by one. The system then branches to the block 200 and repeats.

However, if at the decision block 220, the meter pulse is present, the system determines whether the duration of the meter pulse exceeds 100 milliseconds at a decision block 224. If no, the system branches to the block 218 for repeating a delay of 0.5 milliseconds. If yes, the system advances to a block 226 to set a leadline supervision alarm or other appropriate means for indicating the presence of a short circuit condition. If no, the system returns to the block 210 for a preselected delay. In this embodiment, the duration of pulse received from the data transmitting station 108 must exceed 2 milliseconds.

Figure 4B:
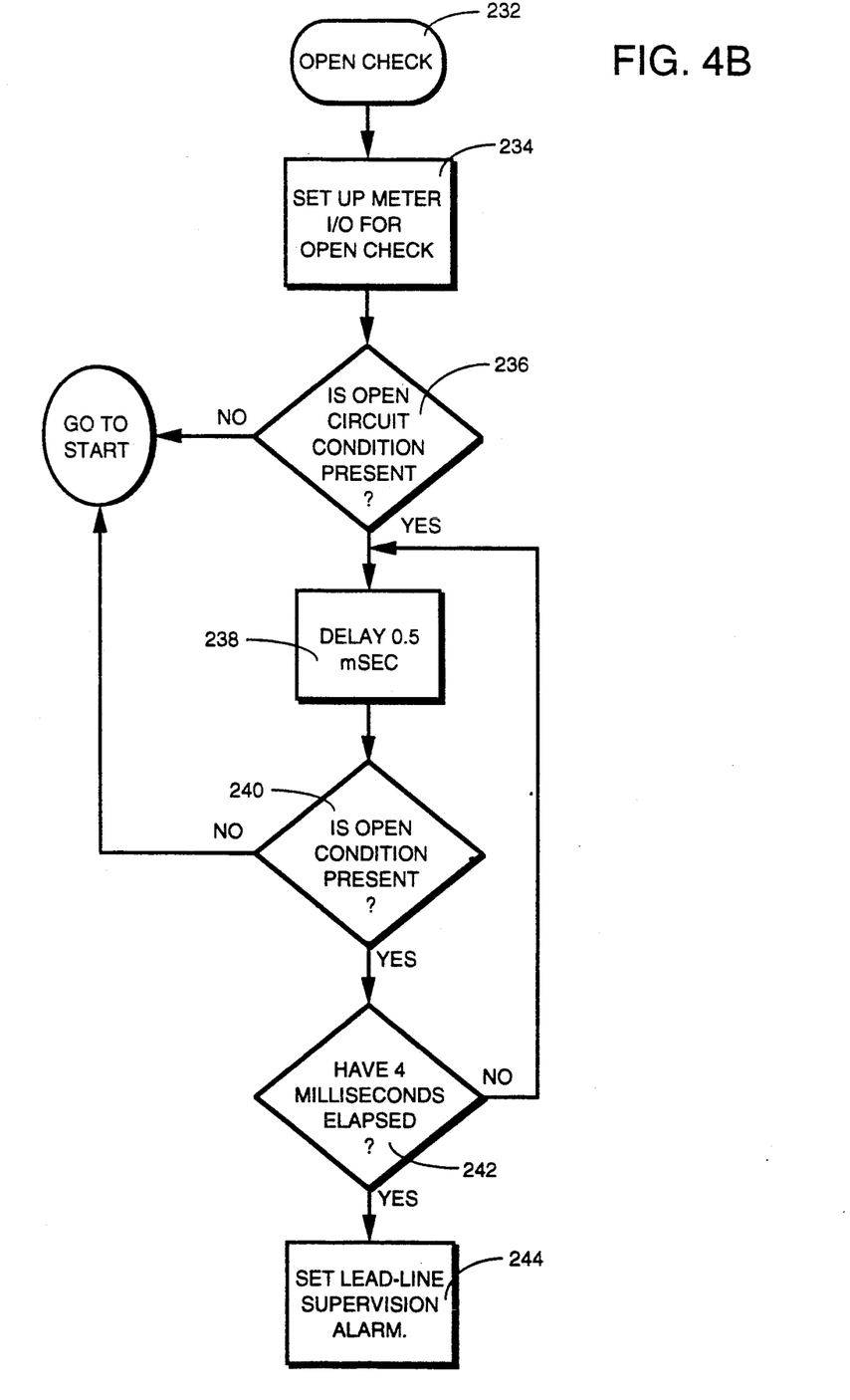
FIG. 4B is a flow chart illustrating operations performed by the microprocessor shown in FIG. 3 for detecting an open circuit condition.

Returning now to the determination of whether the system detects the presence of a meter pulse at the decision block 206, if no, then the system determines whether the open circuit check timer has timed out at the block 208. If no, then the system returns to the decision block 206 for polling the data port 120 to determine whether a meter pulse is present. If yes, the system branches to an open circuit check as shown in FIG. 4B at a block 230.

As with the short circuit test, the system begins at a start block 232 and advances to a next block 234 at which initial conditions are set for performing the open circuit check. At the block 234, the data port 116 is set as an input port, the data port 118 is set as an output port, and the data port 120 is set as an output port. The system then advances to a decision block 236, where the data port 116 is polled to determine whether an open circuit condition exists. If yes, the system advances to a block 238 wherein the system delays 0.5 milliseconds. Thereafter, the system proceeds to a decision block 240, which again polls the input port 116 to see whether an open circuit condition is present. If yes, the system then determines whether the time required to transmit data from the data transmitting station to the receiving station has elapsed (4 milliseconds in this embodiment) at a decision block 242. If no, the system returns to the block 238 for delaying 0.5 milliseconds and then proceeds as described. If yes, a lead-line supervision alarm is set indicative of an open circuit.

Returning to the steps of determining whether an open circuit condition is present at the decision blocks 236 and 240, if no, the system returns to the start block 200 and repeats.

Thus there has been described herein a tamper proof detection system which insures that normal operating conditions exist between a transmitting station and a receiving station and generates a malfunction signal whenever such conditions are not present. The invention consumes very small amounts of power while being relatively simple in operation. It will be understood that changes in the details and arrangements of the circuitry and processes that have been described herein in order to explain the nature of the invention may be made by those skilled in the art within the principle and scope of the present invention as expressed in the appended claims.

What is claimed is:

1. A method for detecting malfunction conditions in a data transmission system including a data transmitting station and a remote data receiving station connected via a data transmission media having first and second data transmission lines, said data transmitting station including output switching means having a first terminal coupled with said first data transmission line and a second output terminal coupled with said second data transmission line operable with said data receiving to provide data pulses thereto, and output current gating means coupled between said first and second data transmission lines, said method comprising:

aplying a potential of a first polarity to said data transmitting station;

generating data pulses of said first polarity upon periodic closures of said switching means;

detecting the presence of each of said data pulses of said first polarity continuing for a first preselected duration; and providing a first output signal when the presence of said data pulses of said first polarity exceeds said first preselected duration.

2. The method of claim 1 further comprising:

supplying a detection signal of a second polarity to said data transmitting station for a second preselected duration;

detecting the presence or absence of said detection signal for said second preselected duration from said data receiving station; and providing a second output signal when the absence of said detection signal exceeds said second preselected duration.

3. The method of claim 1 further comprising:

passing said data pulses of said first polarity to said data receiving station.

4. The method of claim 2 wherein said detection signal is periodically supplied from said data receiving station at a preselected interval.

5. The method of claim 4 wherein said output switching means includes a first output terminal coupled with said first data transmission line and a second output terminal coupled with said second data transmission line, and wherein said current gating means is a diode having its cathode coupled with said first output terminal and its anode coupled with said second output terminal for providing a conductive path between said first and second data transmission lines when said detection signal is applied to said data transmitting station.

6. A method for detecting malfunction conditions in an automatic meter reading system including a meter with output switching means having first and second output terminals and current gating means coupled therebetween, said output switching means periodically closing for providing a plurality of meter pulses, a data receiving station, and a pair of lead lines coupling said first and second terminals of said meter and said data receiving station, comprising:

applying a potential of a first polarity to said data receiving station;

generating data pulses of said first polarity upon periodic closures of said output switching means;

detecting the presence of said data pulses of said first polarity for a first preselected duration;

providing a first output signal when the presence of one of said data pulses exceeds said first preselected duration;

supplying a detection signal of a second polarity to said data transmitting station for a second preselected duration;

detecting the presence or absence of said detection signal for said second preselected duration from said data receiving station; and providing a second output signal when the absence of said detection signal exceeds said second preselected duration.

7. A lead line supervision circuit for detecting malfunction conditions in a data transmission system including a data transmitting station and a data receiving station connected over first and second lead lines, said data transmitting station including output switching means having a first terminal coupled with said first lead line and a second output terminal coupled with said second lead line and operable with said data receiving station to provide data pulses thereto, and output current gating means coupled between said first and second lead lines, said lead line supervision circuit comprising:

means for applying a potential of a first polarity to said data transmitting station;

means for generating data pulses of said first polarity upon periodic closures of said switching means;

means for detecting the presence of each of said data pulses of said first polarity continuing for a first preselected duration; and means for providing a first output signal when the presence of said data pulses of said first polarity exceeds said first preselected duration.

8. The lead line supervision circuit of claim 7 further comprising:

means for supplying a detection signal of a second polarity to said data transmitting station for a second preselected duration;

means for detecting the presence or absence of said detection signal for said second preselected duration from said data receiving station; and means for providing a second output signal when the absence of said detection signal exceeds said second preselected duration.

9. The lead line supervision circuit of claim 7 further comprising:

means for passing said data pulses of said first polarity to said data receiving station.

10. The lead line supervision circuit of claim 8 wherein said detection signal is periodically supplied from said data receiving station at a preselected interval.

11. The lead line supervision circuit of claim 10 wherein said output switching means includes a first output terminal coupled with said first data transmission line and a second output terminal coupled with said second data transmission line, and wherein said current gating means is a diode having its cathode coupled with said first output terminal and its anode coupled with said second output terminal for providing a conductive path between said first and second data transmission lines when said detection signal is applied to said data transmitting station.

12. A circuit for detecting malfunction conditions in a data transmission system for passing data between a data transmitting station and a data receiving station over first and second data transmission lines, said data transmitting station having current gating means coupling said first and second data transmission lines, said malfunction detection circuit comprising:

first signal generating means for providing data pulses of a first polarity;

first sensing means for sensing the presence of said first data pulses for at least a first predetermined duration and providing a first sensing signal when said data signal exceeds said first predetermined duration;

output circuit means for receiving said first sensing signal and providing an output signal indicative of a malfunction;

second detection signal generating means for providing a second detection signal of a second polarity for at least a second predetermined duration;

second sensing means for sensing the presence or the absence of said second detection signal for at least said second predetermined duration and providing a second sensing signal when the absence of said detection signal exceeds said second preselected duration; and output circuit means for receiving said second sensing signal and providing an output signal indicative of the absence of said second sensing signal.

13. The circuit of claim 12 further including:

means for receiving said data pulses of said first polarity for accumulating data provided by said data transmitting station.

14. A lead line supervision circuit incorporated in a meter reading system having an automatic meter reader coupled with a data receiving station via first and second data lines, said automatic meter reader including output switching means having a first terminal coupled with said first data line and a second terminal coupled with said second data line, said output switching means periodically closing upon detection of use of a utility, and current gating means coupled with said first and second switching terminals, said supervision circuit comprising:

first and second data ports coupled with said first and second data lines, respectively, said data ports operable in a first mode for providing data pulses of a first polarity when said output switching means is closed;

pulse sequencer means for providing an enable signal to said first and second data ports for operating said data ports in a second mode for providing an open circuit test signal of a second polarity to said data lines; and pulse detecting circuit means for detecting said data pulses of said first polarity and continuing for a first preselected duration and providing a first malfunction signal indicative of a short circuit condition and for detecting said open circuit test signal and providing a second malfunction signal indicative of an open circuit condition.

15. The lead line supervision circuit of claim 14 further including:

timer means coupled with said pulse detecting circuit means for passing said first and second malfunction signals at a preselected interval.

16. A data transmission system for passing data between a data transmitting station and a data receiving station via first and second data transmission lines comprising:

output switching means with a first output terminal coupled with said first data transmission line and a second output terminal coupled with said second data transmission line, and current gating means coupled between said data lines, said output switching means periodically operable for indicating use at said data transmitting station; and processing means having at least two data ports operable in a first and second mode, a first one of said data ports coupled with said first data transmission line and a second one of said data ports coupled with said second data transmission line, said processing means providing a signal of a first polarity to said first data port, polling said second data port for a predetermined duration for detecting malfunction conditions in said first mode of operation and providing a signal of a second polarity to said second data port and polling said first data port for a second predetermined duration for detecting malfunction conditions in said second mode of operation.

17. The data transmission system of claim 16 wherein said processor means sets and alarm flag when one of said malfunction conditions exists.

* * * * *